(12) United States Patent
Stutton

(10) Patent No.: US 8,037,290 B1
(45) Date of Patent: Oct. 11, 2011

(54) PREBOOT SECURITY DATA UPDATE

(75) Inventor: Robert Stutton, Auckland (NZ)

(73) Assignee: Symantec Corporation, Mountain View, CA (US)

( * ) Notice: Subject to any disclaimer, the term of this patent is extended or adjusted under 35 U.S.C. 154(b) by 865 days.

(21) Appl. No.: 11/173,895

(22) Filed: Jul. 1, 2005

(51) Int. Cl.
*G06F 15/177* (2006.01)

(52) U.S. Cl. .................. 713/2; 713/1; 726/11; 726/22; 726/24; 726/25

(58) Field of Classification Search .......... 726/22, 726/24, 11, 25; 713/1, 2
See application file for complete search history.

(56) References Cited

U.S. PATENT DOCUMENTS

| | | | |
|---|---|---|---|
| 5,349,643 A * | 9/1994 | Cox et al. ...................... | 713/155 |
| 5,948,104 A * | 9/1999 | Gluck et al. ................... | 726/24 |
| 6,052,531 A * | 4/2000 | Waldin et al. ................. | 717/170 |
| 6,074,434 A * | 6/2000 | Cole et al. ..................... | 717/173 |
| 7,673,326 B2 * | 3/2010 | Shelest et al. ................. | 726/4 |
| 7,861,303 B2 * | 12/2010 | Kouznetsov et al. ........... | 726/24 |
| 2003/0036920 A1 * | 2/2003 | Smith et al. .................... | 705/1 |
| 2003/0233566 A1 * | 12/2003 | Kouznetsov et al. .......... | 713/200 |
| 2004/0088692 A1 | 5/2004 | Stutton et al. | |
| 2005/0172142 A1 * | 8/2005 | Shelest et al. ................. | 713/191 |
| 2005/0267954 A1 * | 12/2005 | Lewis et al. ................... | 709/221 |
| 2006/0010485 A1 * | 1/2006 | Gorman ......................... | 726/3 |

OTHER PUBLICATIONS

W. Arbaugh et al. "A Secure and Reliable Bootstrap Architecture" Proceedings of the 1997 IEEE Symposium on Security and Privacy. © 1997 IEEE. pp. 65-71.*
S. S Mueller et al. "Upgrading and Repairing PCs" © 2003 Que Publishing (first printed Sep. 2002). pp. 50, 373, 374, 395, 407, and 408.*
Soper, Mark Edward. "Absolute Beginners Guide to A+ Certification". Published Feb. 25, 2004 by Que Publishing. Various excerpts from Chapters 16-18 and 20 (97 pages).*
"Slipstreaming Windows XP with Service Pack 2 (SP2)" Paul Thurrott's SuperSite for Windows, published Aug. 9, 2004 http://web.archive.org/web/20040813053928/http://www.winsupersite.com/showcase/windowsxp_sp2_slipstream.asp.*
Various posts from the Techspot.com message board, from Mar. 19, 2005 to Apr. 28, 2005 (16 pages) http://www.techspot.com/vb/topic23407.html.*
Schroeder, Carla. "System Recovery with Knoppix" Published Oct. 23, 2003 by IBM (9 pages) http://www.ibm.com/developerworks/linux/library/l-knopx.html.*
BitDefender 8 Professional Plus User Guide. © 2004, known to be published on Mar. 7, 2005 via Internet Archive (102 pages) http://web.archive.org/web/20050307144559/www.bitdefender.com/bd/downloads/documentation/bitdefender_prof_v8.pdf.*
"Virus Scan in Safe Mode?" forum discussion with posts dated between May 1, 2004 and May 2, 2004 (7 pages) http://www.computing.net/answers/security/virus-scan-in-safe-mode/11457.html.*
Rankin, Kyle. "Knoppix Hacks". © 2004 O'Reilly Media Inc. Excerpts from Chapters 1 and 6-8 (93 pages total).*
Wikipedia article for "Microsoft Windows", as published on Jun. 30, 2005. (7 pages) http://en.wikipedia.org/w/index.php?title=Microsoft_Windows&oldid=17901438.*

(Continued)

*Primary Examiner* — Hosuk Song
*Assistant Examiner* — Thomas Gyorfi
(74) *Attorney, Agent, or Firm* — Wilmer Cutler Pickering Hale and Dorr LLP

(57) ABSTRACT

Providing computer security is disclosed. A computing system is booted into a pre operating system environment. The pre operating system environment is used to provide current security data to the computing system. The computer system is booted into an operating system environment other than the pre operating system environment.

25 Claims, 7 Drawing Sheets

OTHER PUBLICATIONS

"Norton Antivirus for Macintosh 7.0 User's Guide" © 2000 Symantec Corp. (60 pages) http://www.symantec.com/techsupp/enterprise/products/navm_ent_7/manuals.html.*

Kasamoto, Jocelyn. "Using McAfee VirusScan v4.5" Published Oct. 2001 by University of Hawaii (15 pages) http://www.hawaii.edu/itsdocs/win/usingyscan45.pdf.*

Israel, Adam. "Fun with Knoppix" Published May 4, 2005 on arstechnica.com (2 pages) http://arstechnica.com/open-source/news/2005/05/linux-20050504.ars.*

Lagerweij, Bart. "Bart's Preinstalled Environment (BartPE) bootable live windows CD/DVD" Published Jun. 2004 (8 pages) http://web.archive.org/web/20040630081855/http://www.nu2.nu/pebuilder/.*

Smith, Roderick. "Linux in a Windows World" Published Feb. 7, 2005 by O'Reilly Media Inc. Excerpt from Chapter 12 (8 pages).*

"Microsoft Windows Family Home Page" Published Apr. 2, 2004 as verified by the Internet Archive (1 page) http://web.archive.org/web/20040402120200/www.microsoft.com/windows/default.mspx.*

"Windows Products and Technologies History: Windows Desktop Products History" Pub. date of Jun. 3, 2004 from Internet Archive (6 pages) http://web.archive.org/web/20040603201031/www.microsoft.com/windows/WinHistoryDesktop.mspx.*

"Windows Products and Technologies History: Windows Server Products History" Pub. date of Apr. 11, 2004 from Internet Archive (4 pages) http://web.archive.org/web/20040411153515/www.microsoft.com/windows/WinHistoryServer.mspx.*

"Which Edition is Right for you?" Published Apr. 4, 2004 as verified by the Internet Archive (2 pages) http://web.archive.org/web/20040404045224/www.microsoft.com/windowsxp/whichxp.asp.*

"What Are Media Center PCs?" Published Jun. 14, 2004 as verified by the Internet Archive (2 pages) http://web.archive.org/web/20040614170838/www.microsoft.com/windowsxp/mediacenter/evaluation/hardware.asp.*

"Tablet PC: An Overview" Published Feb. 15, 2004 as verified by the Internet Archive (6 pages) http://web.archive.org/web/20040215095241/www.microsoft.com/windowsxp/tabletpc/evaluation/overviews/indepth.asp.*

Stanek, William. "Microsoft Windows Server 2003 Inside Out" Published Jun. 9, 2004 by Microsoft Press. Excerpts from Chapters 1 & 2 (21 pages total).*

Jeunhomme, Brieuc. "Network Boot and Exotic Root Howto" Published Aug. 17, 2003 as verified by Internet Archive (21 pages) http://web.archive.org/web/20030817182222/http://www.faqs.org/docs/Linux-HOWTO/Network-boot-HOWTO.html.*

Kegel, Dan. "Remote Network Boot via PXE" © 2002 Dan Kegel. (3 pages) http://www.kegel.com/linux/pxe.html.*

"PXE via Etherboot Howto" Published Jun. 3, 2004 as verified by the Internet Archive (17 pages) http://web.archive.org/web/20040603025456/www.ltsp.org/documentation/pxe.howto.html.*

* cited by examiner

PREBOOT SECURITY DATA UPDATE

BACKGROUND OF THE INVENTION

A computer or other bootable device booted without updating security data may be vulnerable to a security threat and may pose a threat to other devices, e.g., those associated with a network to which the device is or will be connected. In particular, when booting a computer's security data, e.g., without limitation antivirus or other threat definitions, network borne or other attack signatures, configuration settings, etc., may not be the most current security data available. A computer's security data may have been up to date when the computer was turned off but while the computer is off new and/or updated security data becomes available. Such a circumstance may arise, for example, if a computer or other device is configured initially or restored using a disk image or other data recorded at an earlier date, or in the case of a laptop or other mobile device the device has been used outside a protected, e.g., network or other enterprise, environment and is returning to the protected environment at a later date. Therefore, there is a need for an effective way to update security data prior to boot.

BRIEF DESCRIPTION OF THE DRAWINGS

Various embodiments of the invention are disclosed in the following detailed description and the accompanying drawings.

DETAILED DESCRIPTION

Figure 1:
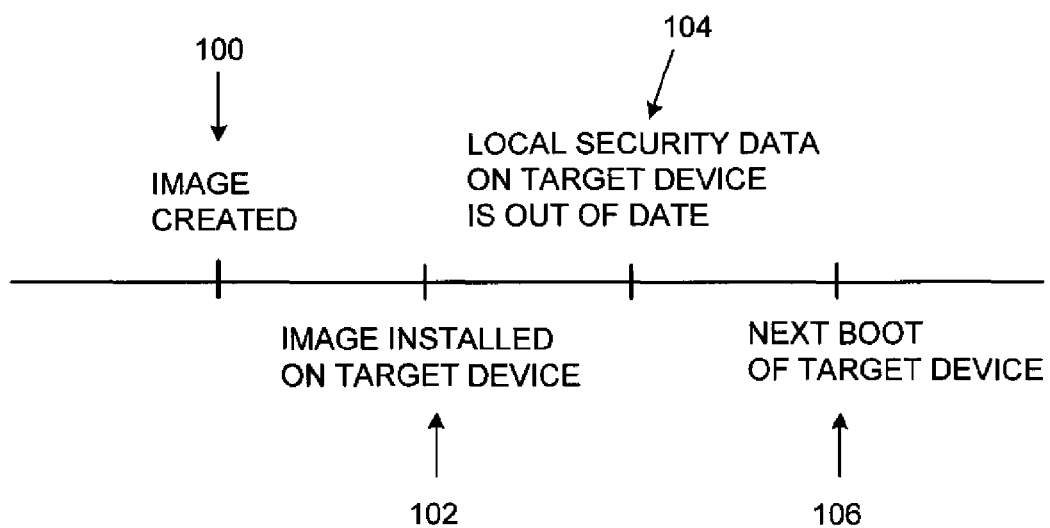
FIG. 1 illustrates a timeline that shows an example of how security data may become out of date.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Updating security data prior to boot is disclosed. A device is booted into a pre operating system environment. The pre operating system environment is used to provide current security data to the device. The device is booted into an operating system environment other than the pre operating system environment, e.g., a primary operating system associated with the device. In some embodiments, updating security data prior to booting the device into the operating system environment other than the pre operating system provides improved security by ensuring the device is protected as well as possible against threats to which the device may be exposed while operating in the latter environment.

In some embodiments, updating security data prior to booting the device into the operating system environment other than the pre operating system is performed in connection with initial deployment of a new or newly-configured computing system in a network environment. For example, a newly-purchased system may arrive with a pre-determined suite of applications installed prior to shipping by a vendor from whom the system was purchased, and the techniques described herein may be used to install a security or other application not included by the vendor and/or to update or upgrade an application supplied by the vendor and/or associated data. In other embodiments, an image used to configure or restore a system may include outdated security data or omit a desired security application and/or data, and such missing application(s) and/or data may be provided in a pre operating system environment, as described herein, prior to an initial boot into a primary or other operating system. In some embodiments, the system may be booted into the pre operating environment and/or the current security data may be provided via a network. In some embodiments the boot into the pre operating system environment and/or the current security data may be provided locally using one or more volumes of removable or other storage media, such as a diskette, CD, memory key, or other media.

FIG. 1 illustrates a timeline that shows an example of how security data may become out of date. In the example shown, an image is created at 100. The image may be created from a device to be copied, such as a personal computer to be backed up or a personal computer having a standard configuration desired to be cloned on other computers, and captures the contents and/or state of the device from which it is created. In some embodiments, the image may be a disk image created by the Symantec™ Ghost™ application available from Symantec™ Corporation of Cupertino, Calif. System files, programs, device configurations, application settings, and documents are some examples of information captured by an image.

The image is installed on a target device at 102. The target device may be the same device as the device from which the image is created or it may be another device, e.g., one to be deployed with a standard configuration captured in the image. After installation of the image, the target device is a replica of the device from which the image was created including any security data as installed in that device as of the time the image was created.

Security data is data associated with the security of a device. It may be an input to a security related application, such as virus signatures used by a security application to identify viruses. Security data may also be security configurations for interfaces that are potential sources of security threats. For example, firewall settings and security configurations for interne browser applications and email applications may be security data. Rules for processing files or potential security threats are another example, as are software patches and filters. Current security data may contain state information associated with the target device or an application on the target device. Registry settings may also be security data. Security data may also include data associated with securing a device against unwanted or unsolicited transmissions. For example, security data may include spam filters for email applications.

At 104 the local security data on the target device becomes out of date. For example, a new virus is released for which a signature is available. Since the virus signature is new, local security data on some target devices may not have the virus signature and are not current. Because the new security data becomes available at 104, after the image was created at 100, the security data in the image created and consequently the security data in the image as installed on the target device at 102 became out of date when the new security data became available at 104.

The next boot of the target device occurs at 106. Because the image installed at 102 did not include the new/updated security data that became available at 104, the target device, if booted at 106 without first updating the security data, may be vulnerable to a threat associated with the new/updated security data that became available at 104. Note the target device would similarly be vulnerable if the image had been installed in the target device after the new security data became available at 104.

Using a pre OS environment to provide current security data to a device prior to boot of a primary OS is disclosed. By updating security data prior to boot of the primary OS, a device and other devices potentially affected by it may be protected against threats to which the device might otherwise have been exposed upon being booted.

Figure 2:
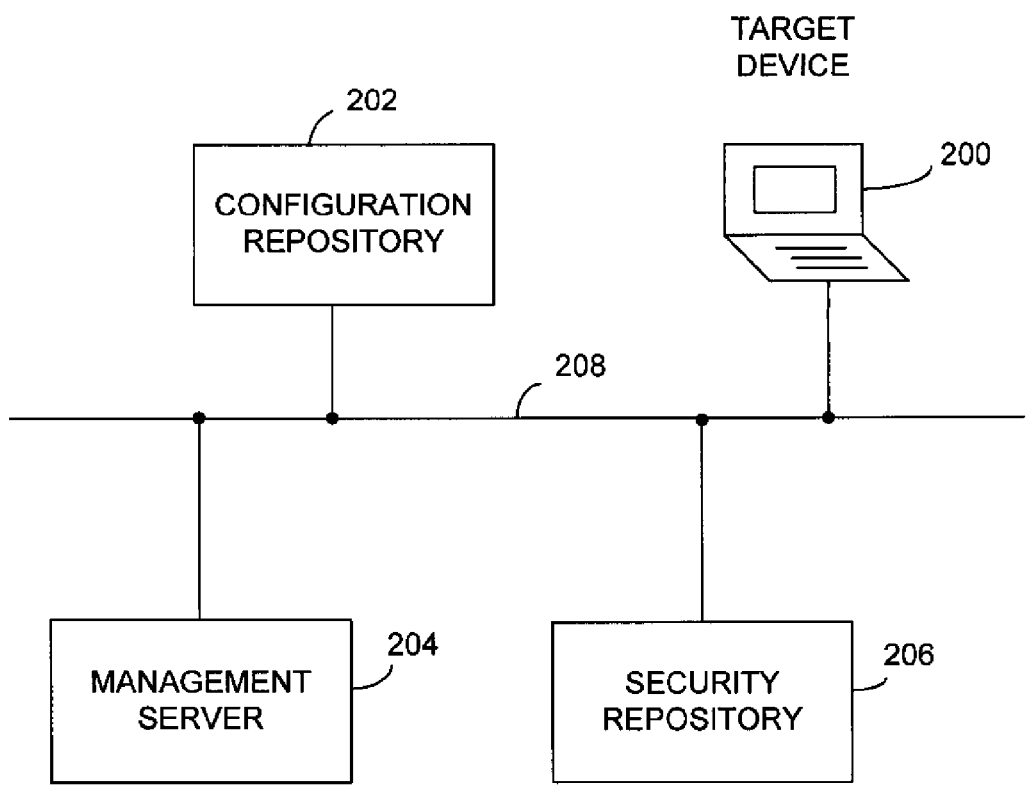
FIG. 2 illustrates an embodiment of a distributed system to install an image on a target device and provide current security data to a target device.

FIG. 2 illustrates an embodiment of a distributed system to install an image on a target device and provide current security data to a target device. In the example shown, target device 200, configuration repository 202, management server 204, and security repository 206 are coupled together via a network 208. An image to be installed is stored in configuration repository 202 and is installed on target device 200. Installation of the image is controlled by management server 204. Current security data is stored in security repository 206. Management server 204 interacts with target device 200 to provide current security data to target device 200.

When installing an image on target device 200, management server 204 determines whether target device 200 is requesting that an image be installed on it. The request for an image to be installed may be an explicit request. Target device 200 may transmit a request signal for installation of an image to management server 204. Alternatively, the request may be implied or is not transmitted. For example, management server 204 may poll target device 200 for a status signal indicating that target device 200 wants an image installed on it. In another example, target device 200 connects to management server 204 only when it wants an image to be installed.

The presence of target device 200 on the network indicates to management server 204 to install an image on target device 200. In some embodiments, a client installed or otherwise running at target device 200, e.g., by insertion into target device 200 of a diskette or CD-ROM provided to enable target device 200 to be configured and deployed, is used to make the management server 204 aware of the need to install an image on target device 200.

Management server 204 retrieves an image from configuration repository 202 that is appropriate for target device 200. Some images are appropriate for and selected based on the type of target device. In some embodiments, images are selected based on the intended user or usage of the target device. In some embodiments, the image is selected automatically by management server 204 based on one or more criteria. In some embodiments, management server 204 is a computer that a system administrator or other authoritative user uses to install an appropriate image on target device 200. Using management server 204, a system administrator may control what image is installed and when it is installed on target device 200.

Target device 200 may be a variety of electronic devices that boot. In some embodiments, the target device is a computer or PDA. In some embodiments, the target device is a network component including a server, a storage device, or a router. In some embodiments, the target device is a personal communication device such as a cell phone or Blackberry. In some embodiments, the target device is a consumer electronic device, such a digital video recorder or a game console. These are some examples of target devices and are not meant to be limiting.

In some embodiments, current security data is provided to target device 200 prior to booting target device 200 into its primary operating system environment. In the figure shown, current security data is stored in security repository 206. Management server 204 determines that target device 200 is requesting current security data; as with installing an image, the request for current security data may be an explicit request or an implied request. The current security data in security repository 206 may be updated on a time driven basis or event driven basis. For example, the current security data may be updated daily or as soon as new information is available. In some embodiments, the security repository 206 may be updated via network 208 and/or other networks, either periodically, or as new data becomes available. In some embodiments, security repository 206 acts as a central repository for the most up-to-date security data for target device 200 and other devices associated with network 208.

In some embodiments, once management server 204 has caused an image from configuration repository 202 to be installed on target device 200, e.g., after booting target device 200 into a pre-operating system environment such as PC-DOS, the pre-boot execution environment (PXE), or some other environment other than a primary operating system to be used on the target device (e.g., Microsoft™ Windows), management server 204 causes security data associated with the image to be updated to reflect current security data stored in security repository 206 prior to the target device 200 being booted into its primary operating system. Although in this example the pre-boot environment is described as being one other than a "primary" operating system associated with the target device 200, in other embodiments the updated security data may relate to threats associated with any operating system environment other than the pre-operating system environment into which the target device 200 is pre-booted in order to update the security data, even if that operating system is not a "primary" operating system for the target device 200.

Although target device 200, configuration repository 202, management server 204, and security repository 206 are shown in FIG. 2 as separate devices, two or more of them may in some embodiments be combined and/or implemented in the same physical device.

Figure 3:
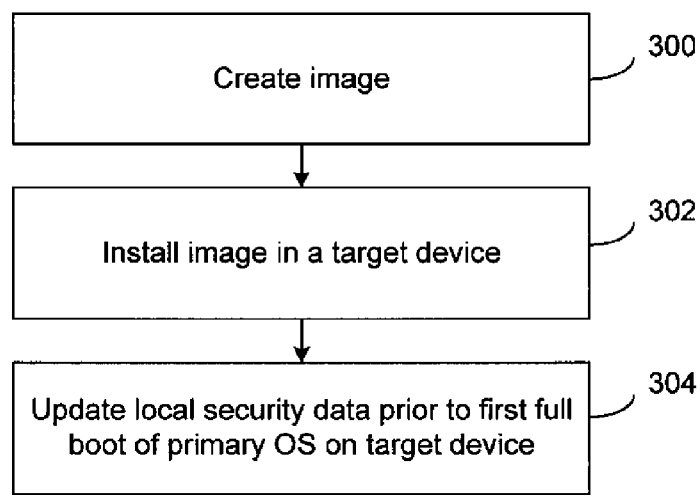
FIG. 3 illustrates a process for providing current security data to a target device prior to the first full boot.

FIG. 3 illustrates a process for providing current security data to a target device prior to the first full boot. An image is created at 300. The image may contain files, settings, applications, and data including security data. The image is installed in a target device at 302. After installation, the information captured by the image is on the target device. Security data on the target device is sometimes referred to herein as local security data. At 304, the local security data is updated prior to the first full boot of the primary operating system (OS) on the target device.

In some embodiments, 304 may include adding or deleting one or more files. In some embodiments, 304 may include reading from and/or writing to the Microsoft™ Windows Registry or similar configuration data while offline, i.e., prior to booting into a primary operating system with which the Registry or other configuration data repository or structure is associated.

In some embodiments, the primary OS is an operating system used in a normal operating mode of the target device. For example, if the target device is a router its primary OS may be LINUX if its routing applications run on that operating system. If the user of a computer in normal operation uses Microsoft™ Windows as the operating system, then that is the primary operating system. In some embodiments, the target device is a virtual machine in which the OS used in the normal operating mode is located on a virtual disk. The virtual disk may be stored within a file on a host system. The OS located on the virtual disk is the primary OS in this example. In some embodiments, accessing and updating security data within the primary OS of a virtual machine involves accessing the virtual disk file and reading and writing to the files and Registry stored within. In some embodiments, target devices are dual boot devices and the target device may boot into more than one operating system environments. For example, an engineer may need to run engineering applications in LINUX but may also need to read and write reports using Microsoft™ Windows. The engineer's laptop may be configured to be a dual boot device and boot into the LINUX environment or the Microsoft Windows environment. The primary operating system may be either operating system.

In some embodiments, some time may pass between the steps described. For example, a system administrator in a large company or school may be responsible for configuring new computers. Many new computers are deployed regularly and creating a new image at 300 may be a time consuming process. In some cases, the same image created at 300 may be used to configure or deploy multiple target devices and 302 and 304 may be performed for each such target device, e.g., at the time each such device is configured and/or deployed. As such, some time passes between creating an image at 300 and the first full boot. By updating security data in step 304, images may be created less frequently but each target device configured using the image may still have updated local security data prior to the first full boot. Similarly, if some time passes between installing an image at step 302 and the first full boot, the target device's local security data is still updated prior to the first full boot.

Other embodiments to provide current security data to a target device prior to the first full boot exist. For example, creating an image at 300 and installing the image at 304 may not be performed in some embodiments. The primary OS and/or the pre OS environment may be installed using other methods besides using an image. For example, the primary OS and/or the pre OS environment may be installed using a removable media (e.g., a CD, a floppy disk, etc.) or using a network accessible device. These are some examples and are not meant to be limiting. Additional steps may also be performed in addition to those described. For example, after updating local security data prior to the first full boot of the primary OS, security data may be updated in a pre OS environment; this may occur once or multiple times.

Figure 4:
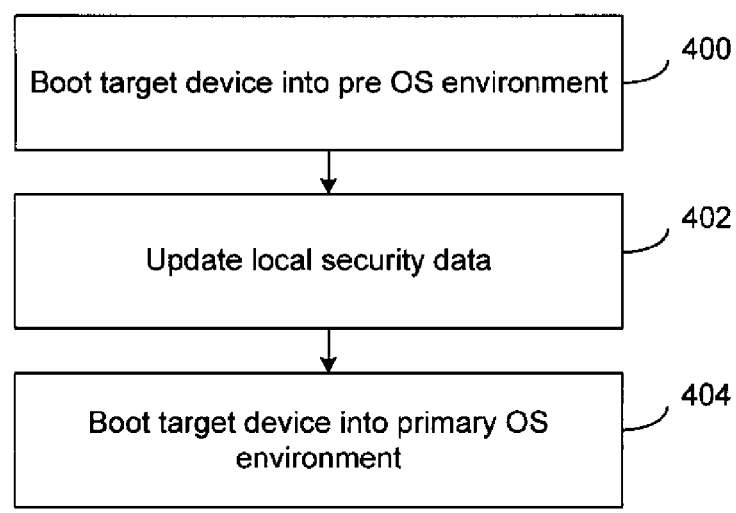
FIG. 4 illustrates a process for booting into a pre OS environment to update local security data on a target device.

FIG. 4 illustrates a process for booting into a pre OS environment to update local security data on a target device. In some embodiments, the process of FIG. 4 is used to implement 304 of FIG. 3. The target device is booted into a pre OS environment at 400. A target device may be configured to always boot initially into a pre OS environment, or a user may select to boot into a pre OS environment or insert a deployment or other diskette or other media or device that causes the target to boot into the pre OS. An interface may be presented to the user. Using an input device (such as a keyboard or stylus), the user selects the environment to boot into from a list presented. In some embodiments, an entity other than a user decides which environment to boot into. The local security data is updated at 402. In some embodiments, the target device is coupled to a management server and security repository via a network. The management server may retrieve current security data from the security repository and send it to the target device. The management server may select current security data appropriate for the target device and transmit only the selected security data to the target device. A client running at the target device, in the pre OS environment, may be used to install the current security data locally. The target device is booted into the primary OS environment at 404.

In some embodiments, the local security data updated at 402 includes an application or a program. For example, a new security related application, such as a new virtual private network (VPN) application, a new antivirus program, or a new website access monitoring client may be installed on the target device. Installing an application may include additional steps so permissions on the target device are properly configured. For example, some handshaking may be performed or some settings may be configured so that the target device in the pre OS environment is in a state that allows applications to be installed.

The pre OS is in some embodiments an instance of an operating system that is not the primary OS instance. For example, if the primary OS of a target device is Microsoft Windows, a pre OS might be DOS or Windows Preinstallation Environment (WinPE). In some embodiments, the pre OS has a reduced function set compared to the primary OS. The pre OS may be a manufacturing version or mode of an operating system where some functions are not supported by the manufacturing version/mode. However, it is not a requirement that the set of functions supported by a pre OS be a reduced set of the functions supported by the primary OS. In some embodiments, the primary OS and the pre OS are the same operating system but configured or enabled differently. For example, the primary OS may be Microsoft Windows and the pre OS is the same installation of Microsoft Windows but in a safe boot mode. Some operating systems that may be either the pre OS or the primary OS include DOS, the Microsoft Windows operating systems, Microsoft WinPE, UNIX related operating systems (including Red Hat, SUN Solaris), Apple MacOS, a Preboot Execution Environment (PXE), and an Extensible Firmware Interface (EFI).

In some embodiments, the pre OS is stored locally on the target device, such as on a hard disk drive or BIOS ROM of a computer. In some embodiments, the pre OS is stored on removable media, such as a floppy disk or compact disk. The pre OS is accessed on the removable media through an input drive such as a disk drive. In some embodiments, the pre OS is stored on another device and the target device accesses the pre OS stored on the other device through a network or interface.

One method for booting into a pre OS environment is disclosed in co-pending U.S. patent application Ser. No. 10/284,827 (U.S. Patent Application Publication No. 2004/0088692) entitled VIRTUAL PARTITION filed Oct. 30, 2002, which is incorporated herein by reference for all purposes. A virtual partition is created in a storage device, such as a hard disk drive, associated with a computer system. The storage device is configured to boot the computer system using a pre OS associated with the virtual partition. A task is performed in the pre OS and when it is completed the computer system is configured to boot using an operating system other than the one in the virtual partition. In some embodiments, a device is booted into a pre OS associated with a virtual partition, local security data is updated in the pre OS environment, and the device then boots into a primary OS not associated with the virtual partition.

Booting from a network is another method for booting into a pre OS environment. The Preboot Execution Environment (PXE) is one example of booting from a network. A target device establishes communication with a server via a network. Information needed to transmit and receive data over the network is obtained. For example, IP addresses and the name of the bootstrap program to load are obtained. The bootstrap program is transferred via the network from the server to the target device. The bootstrap program downloads the pre OS from the server and boots the target device into the pre OS environment. Booting from a network allows flexibility in selecting the environment to boot into. For example, a system administrator may change which operating system is the pre OS. Updates to the pre OS may also be supported. As newer versions of an operating system (used as the pre OS) are released, target devices may access the newer versions.

A user may be allowed to select which operating system environment to boot into. An interface presents the user with a list of operating environments to boot into, such as the pre OS and the primary OS. There may be a default selection set to the pre OS. Using inputs from an input device (e.g., a keyboard, a stylus, or a mouse), the user selects the operating system environment to boot into. The target device may be a dual boot device, with partitions for each operating system environment.

Figure 5A:
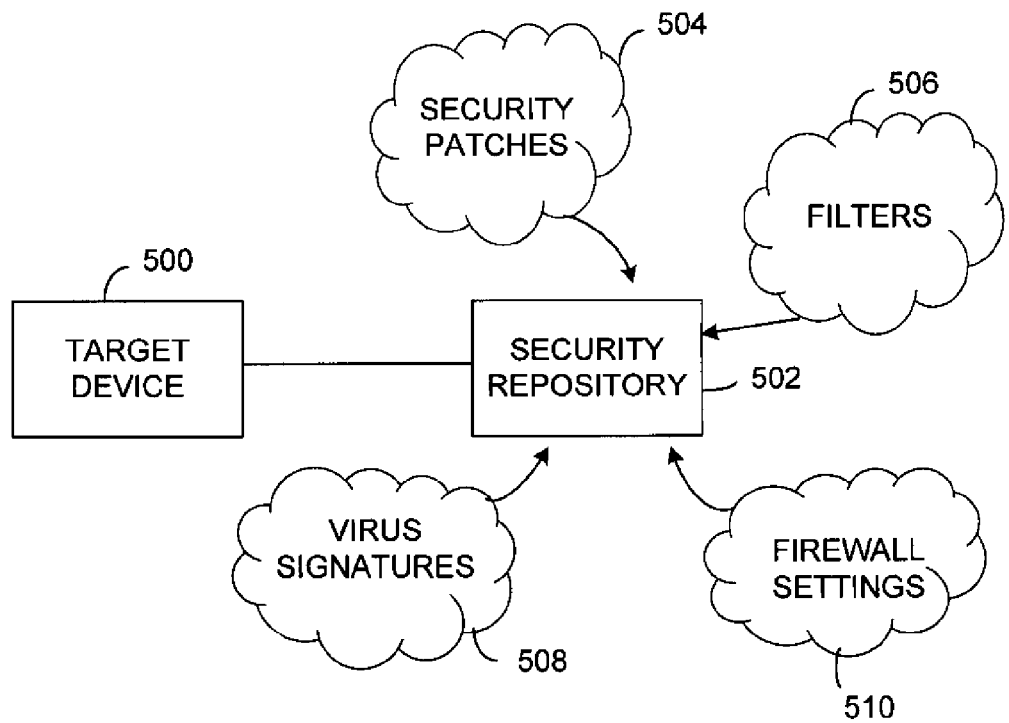
FIG. 5A illustrates current security data on a network accessible device located remotely from the target device.

FIG. 5A illustrates current security data on a network accessible device located remotely from the target device. In the example shown, current security data is stored in security repository 502. Current security data is provided to target device 500, which in some embodiments occurs when target device 500 is booted into a pre OS environment. In some embodiments, another device (not shown) is responsible for retrieving current security data from security repository 502 and sending it to target device 500. In the example shown, four security related pieces of information are sent to security repository 502: security patches 504, filters 506, virus signatures 508, and firewall settings 510. The security related pieces of information are used to generate the current security data in security repository 502. Security patches 504 provide fixes to known security vulnerabilities. Filters 506 may be used by applications to prevent filtered data from being accessed by a user or application. For example, an email application may use filters 506 to filter emails that potentially contain a virus or unwanted or unsolicited information (e.g., spam). Current security data may be used to identify security threats, such as virus signatures 508. Using firewall settings 510, a firewall of a target device may be changed to a more secure mode.

Security related information may be sent to security repository 502 on regular basis. For example, security related information may be sent to security repository 502 every night. In some embodiments, only security related information that has changed or is new is sent. Security related information may be sent to security repository 502 on an event driven basis. For example, if a virulent, fast spreading virus is released, information associated with the virus may be sent to security repository 502 as soon as it becomes available given the severity of the virus.

Security repository 502 may process the received security related information to create the current security data. For example, security repository 502 may look for and delete duplicate security related information. Current security data stored in security repository 502 may be deleted after a period of time without any updates. The current security data may also be organized in the form of a table or database in security repository 502. Organization of the current security data may be according to the type of target device the data is associated with or based on the type of security data.

Figure 5B:
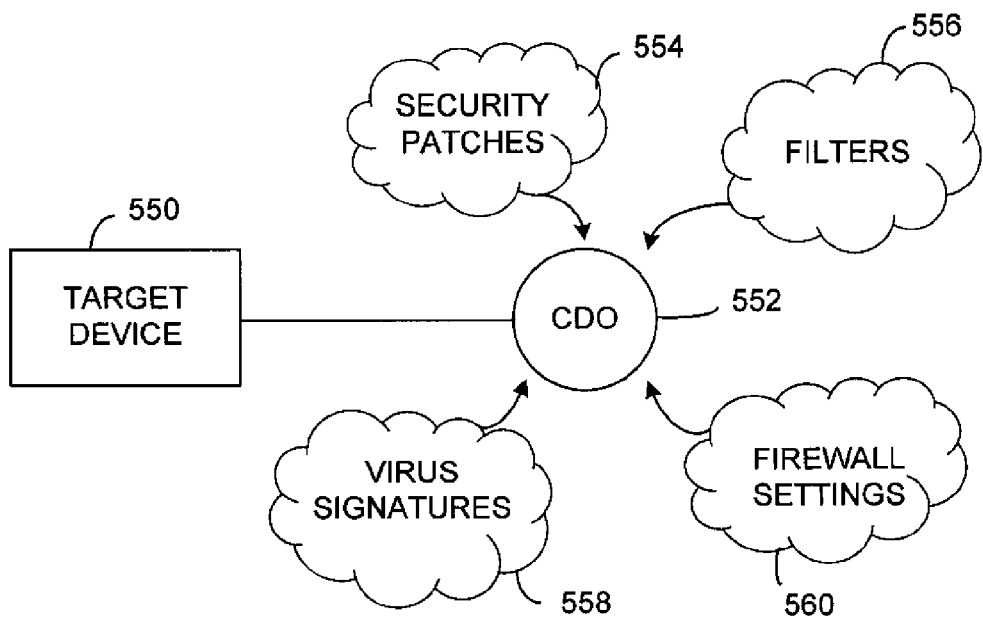
FIG. 5B illustrates current security data on removable storage located locally with respect to the target device.

FIG. 5B illustrates current security data on removable storage located locally with respect to the target device. In the example shown, current security data is stored on CD 552. CD 552, including the current security data, may be provided to target device 550 after it boots into a pre OS environment. An input drive, such as a local CD drive, is used to access the current security data on CD 552. Security patches 554, filters 556, virus signatures 558, and firewall settings 560 are used to generate the current security data.

Figure 6:
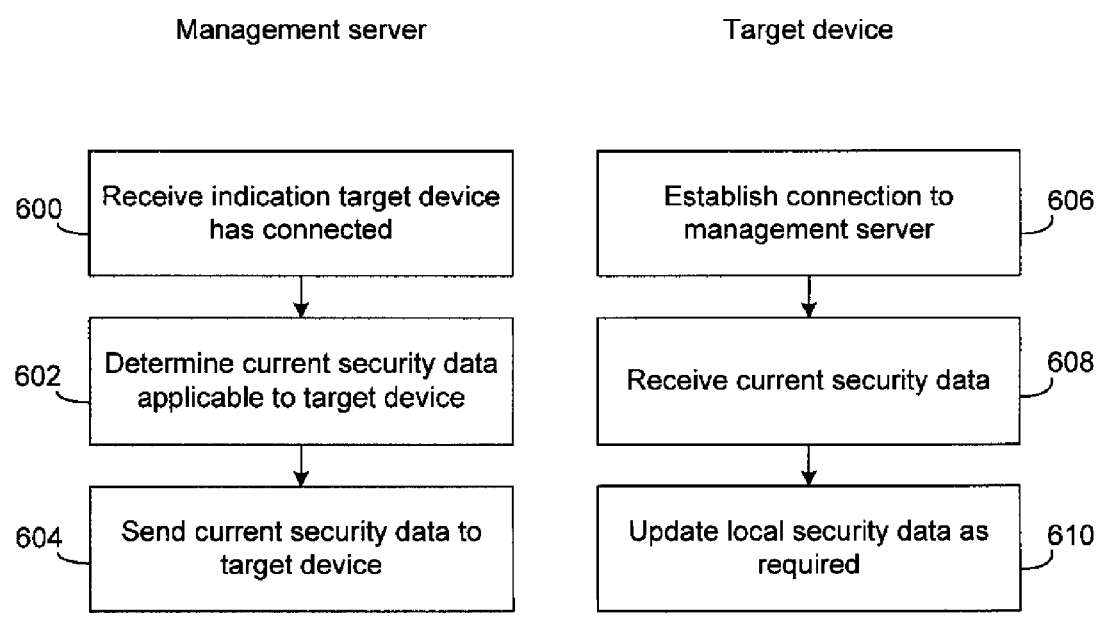
FIG. 6 illustrates a process for providing current security data to a target device using a management server.

FIG. 6 illustrates a process for providing current security data to a target device using a management server. This process may be implemented on target device 200 and management server 204 and may occur after target device 200 boots into a pre OS environment. A connection is established to a management server at 606. The target device may send a signal or packet to the management server and establish a connection. Alternatively, the management server may detect the presence of the target device and initiate a connection. Handshaking and communication protocols may be employed. The management server receives an indication a target device has connected at 600.

Current security data applicable to the target device is determined at step 602. Selection of applicable current security data may be selected based on a variety of factors including the type of target device and intended usage of the target device. In some embodiments, the management server knows the state of local security data on the target device and selects only security data that has changed or is new. The current security data is sent to the target device at 604. The target device receives the current security data at 608. The local security data is updated as required at 610.

In some embodiments, 606, 608, and 610 are implemented using a client on the target device. A counterpart application, such as a server, may perform 600, 602, and 604. In some embodiments, a driver is installed and performs one or more of 606, 608, and 610. The driver may be installed when an image is installed on the target device. After updating the local security data on the target device, the driver is unloaded. In some embodiments, an agent is used to perform one or more of 606, 608, and 610.

Figure 7:
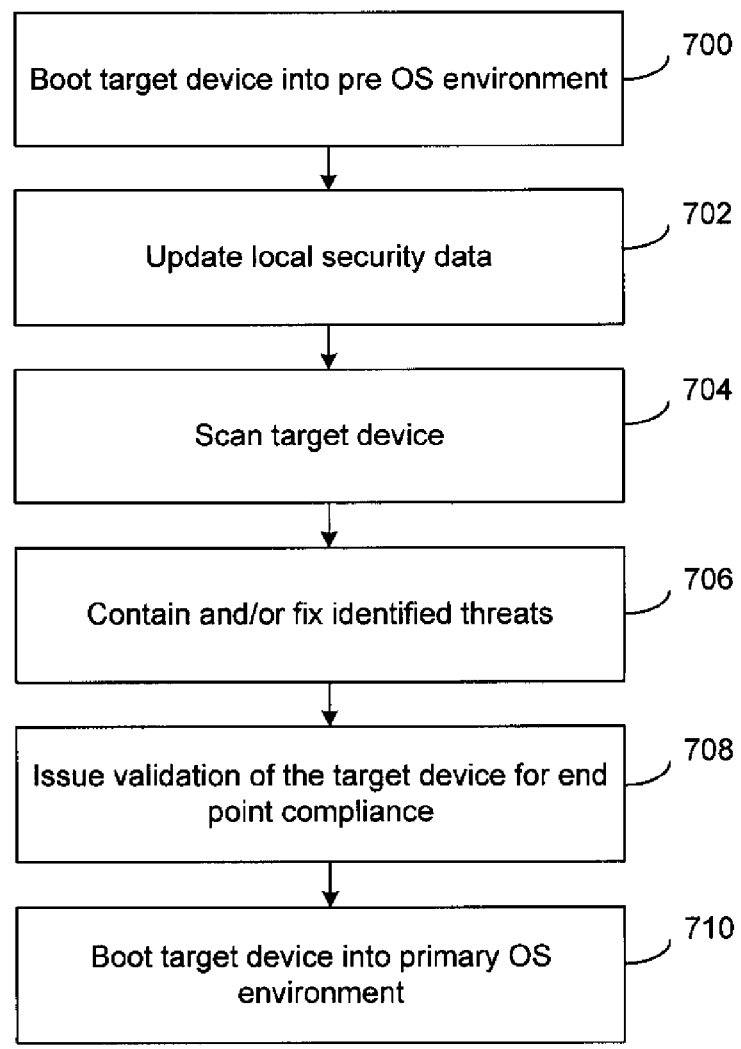
FIG. 7 illustrates a process for updating local data in an end point compliance context.

FIG. 7 illustrates a process for updating local data in an end point compliance context. In the example shown, devices are validated for end point compliance before they are granted access to network resources. Validation may include determining that devices are associated with legitimate users. Validation may also include determining that devices are not a potential security threat, for example by scanning devices for viruses which the device could potentially introduce into the system. A target device is booted in a pre OS environment at 700. A variety of methods may be employed to boot the target device into a pre OS environment. Local security data is updated at 702. For example, current security data may be obtained from a local or remote source and used to update the local security data on the target device. While local security data is updated in the example shown, in other embodiments other and/or different data may be updated at 702. The target device is scanned at 704. In some embodiments, 704 includes running a vulnerability or other automated threat assessment. A report may be generated regarding identified threats. In some embodiments, the report is transmitted to a system administrator. Identified threats are contained and/or fixed at 706. For example, a software update or patch may be installed, or a compromised or malicious file or other data may be deleted or quarantined. In some embodiments, identified threats are only reported and are not contained or fixed. Validation of the target device is issued for end point compliance at 708. For example, a certificate may be provided to and/or updated on the target device as a credential checked by a network to which the target device is attempting to connect. In some embodiments, if a security threat is identified in the scan at 704, the target device is not validated. In some embodiments, so long as all identified security threats are contained or fixed at 706, the target device is validated. The target device is booted into the primary OS environment at 710. In some embodiments, 710 includes requesting permission to connect to a network and providing the validation issued at 708.

The illustrated process of updating security data in an end point compliance context has a variety of applications. For example, a mobile device associated with an end point compliance environment or solution may leave the environment and associate with unsecured or unknown resources. By updating the local security data and scanning the mobile device, a security threat may be prevented from entering, for example, a network associated with the end point compliance environment. For example, a virus signature may not have existed at the last update of a mobile device's local security data. While the mobile device was away, it acquired the virus associated with the signature. If the mobile device does not update the local security data at 702, scanning at 704 may not detect the virus and allow the infected mobile device access a network associated with the end point compliance environment. Conversely, updating local security data at 702 may protect the mobile device. If a security threat has been introduced into other devices associated with the end point compliance environment, updating the local security data of the mobile device with the security patch may reduce the vulnerability of the mobile device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing computer security including:
   establishing a connection from a computing system to a network;
   receiving, in response to detection of the connection by a server, a network address and a bootstrap program identifier at the computing system via the network;
   downloading, automatically, a bootstrap program associated with the bootstrap program identifier and the network address;
   receiving a pre-operating system at the computing system via the network by the bootstrap program, the pre-operating system selected automatically by the server based on a type of the computing system;
   booting the computing system into a pre-operating system environment using the received pre-operating system;
   performing a security check of the computing system, using the pre-operating system environment, to ensure conformity with a security requirement received from a repository external to the computing system;
   using the pre-operating system environment to provide to the computing system a current security data that is stored in and received from an external repository that is not part of the pre-operating system environment or a primary operating system environment of the computing system, wherein the security data is based on a plurality of factors including a type of the computing system;
   rendering the computing system more secure with respect to a vulnerability associated with the primary operating system environment using the security data based at least in part on the security check, wherein rendering the computing system more secure comprises configuring using the pre-operating system environment, a firewall of the primary operating system;
   providing validation of the conformity with the security requirement using the pre-operating system environment, wherein validation comprises a credential checked by the network during an attempt by the computer system to connect to the network; and
   booting the computing system into an operating system environment other than the pre-operating system environment.

2. The method as recited in claim 1 further including using the pre-operating system environment to replace outdated security data on the computing system with the current security data.

3. The method as recited in claim 1, wherein the current security data includes a signature, a definition, a firewall setting of an internet browser of the computing system, a firewall setting of an email application of the computing system and one or more of the following: an application; a rule; and a setting.

4. The method as recited in claim 1, wherein (1) booting the computing system into a pre-operating system environment and (2) using the pre-operating system environment to provide current security data to the computing system are performed in connection with initial deployment of the computing system in a network environment.

5. The method as recited in claim 1, wherein the computing system is booted via a network into a pre-operating system environment by a device other than the computing system.

6. The method as recited in claim 1 further including:
   creating an image; and
   installing the image on the computing system;
   wherein the current security data comprises an update to a local security data associated with the image.

7. The method as recited in claim 1, wherein the current security data is provided via a network.

8. The method as recited in claim 1, wherein the current security data is provided on a removable media.

9. The method of claim 1, wherein the pre-operating system environment and the primary operating system environment of the computing system comprise separate operating system installations on the computing system.

10. The method of claim 1, wherein the computing system comprises at least one of: a storage device, a digital video recorder, and a router.

11. A method for providing end point compliance, comprising:
  establishing a connection from a computing system to a a network;
  receiving, in response to detection of the connection by a server, a network address and a bootstrap program identifier at the computing system via the network;
  downloading, automatically, a bootstrap program associated with the bootstrap program identifier and the network address;
  receiving a pre-operating system at the computing system via the network by the bootstrap program, the pre-operating system selected automatically by the server based on type of the computing system;
  booting the computing system into a pre-operating system environment using the received pre-operating system;
  using the pre-operating system environment to perform a security check of the computing system to ensure it conforms with a security requirement stored in and received from an external repository that is not part of the pre-operating system environment or the operating system environment, wherein the security requirement is based on a plurality of factors including a type of the computing system;
  rendering the computing system more secure with respect to a vulnerability associated with the primary operating system environment using the security requirement, wherein rendering the computing system more secure comprises configuring, using the pre-operating system environment, a firewall of the primary operating system of the computing system;
  providing validation of the conformity with the security requirement using the pre-operating system environment, wherein validation comprises a credential checked by the network during an attempt by the computer system to connect to the network; and
  determining based at least in part on the security check whether to boot the computing system into an operating system environment other than the pre-operating system environment.

12. The method as recited in claim 11, further comprising using the pre-operating system environment, prior to the computing system being booted into the operating system environment other than the pre-operating system environment, to modify the computing system as required to conform to the requirement in the event the security check indicates the computing system does not conform to the security requirement.

13. A system for providing computer security including:
  a processor configured to:
    establish a connection from a computing system to a network;
    receive, in response to detection of the connection by a server, a network address and a bootstrap program identifier at the computing system via the network;
    download, automatically, a bootstrap program associated with the bootstrap program identifier and the network address;
    receive a pre-operating system at the computing system via the network, the pre-operating system selected automatically by the server based on a type of the computing system;
    boot the computing system into a pre operating system environment using the received pre-operating system;
    use the pre-operating system environment to perform a security check of the computing system to ensure conformity with a security requirement received from a repository remote from the computing system;
    use the pre-operating system environment to install onto the computing system a current security data stored in and received from the remote repository based at least in part on the security check, wherein the security data renders the computing system more secure with respect to a vulnerability associated with the primary operating system environment, rendering the computing system more secure comprising configuring, using the pre-operating system environment, a firewall of the primary operating system, wherein the security data is based on a plurality of factors including a type of the computing system; and
    boot the computing system into an operating system environment other than the pre-operating system environment; and
  an interface coupled to the processor and configured to use the pre-operating system environment to obtain the current security data from the remote repository, wherein the interface is further configured to provide validation of the conformity with the security requirement, the validation comprising a credential checked by the network during an attempt by the computer system to connect to the network.

14. The system as recited in claim 13, wherein the current security data includes a definition and one or more of the following: an application; a rule; a setting; and a signature.

15. The system as recited in claim 13, wherein the computing system has access to a network in the pre operating system environment.

16. The system as recited in claim 13, wherein (1) booting the computing system into a pre-operating system environment and (2) using the pre-operating system environment to provide current security data to the computing system are performed in connection with initial deployment of the computing system in a network environment.

17. The system as recited in claim 13, wherein the computing system is booted via a network into a pre-operating system environment by a device other than the computing system.

18. The system as recited in claim 13, wherein the current security data is provided via a network.

19. The system of claim 13, wherein the pre-operating system environment and the primary operating system environment of the computing system comprise separate operating system installations on the computing system.

20. A computer program product for providing computer security, the computer program product being embodied in a non-transitory computer readable storage medium and comprising computer instructions which, when executed, cause a computer to:
  establish a connection from a computing system to a network;
  receive, in response to detection of the connection by a server, a network address and a bootstrap program identifier at the computing system via the network;
  download, automatically, a bootstrap program associated with the bootstrap program identifier and the network address;
  receive a pre-operating system at the computing system via the network, the pre-operating system selected automatically by the server based on a type of the computing system;

boot the computing system into a pre-operating system environment using the received pre-operating system;

use the pre-operating system environment to perform a security check of the computing system to ensure conformity with a security requirement received from a repository external to the computing system;

use the pre-operating system environment to provide to the computing system a current security data stored in and received from the external repository based at least in part on the security check, wherein the security data renders the computer system more secure with respect to a vulnerability associated with the primary operating system environment, rendering the computing system more secure comprising configuring, using the pre-operating system environment, a firewall of the primary operating system wherein the security data is based on a plurality of factors including a type of the computing system;

provide validation of the conformity with the security requirement using the pre-operating system environment, wherein validation comprises a credential checked by the network during an attempt by the computer system to connect to the network; and boot the computing system into an operating system environment other than the pre-operating system environment.

21. The computer program product as recited in claim 20, wherein the current security data includes a signature and one or more of the following: an application; a rule; a setting; and a definition.

22. The computer program product as recited in claim 20, wherein the computing system has access to a network in the pre-operating system environment.

23. The computer program product as recited in claim 20, wherein (1) booting the computing system into a pre operating system environment and (2) using the pre-operating system environment to provide current security data to the computing system are performed in connection with initial deployment of the computing system in a network environment.

24. The computer program product as recited in claim 20, wherein the computing system is booted via a network into a pre-operating system environment by a device other than the computing system.

25. The computer program product as recited in claim 20, wherein the current security data is provided via a network.

* * * * *